United States Patent [19]

Doerr

[11] 4,315,174

[45] Feb. 9, 1982

[54] REVERSIBLE D.C. MOTOR WITH OVER-DRIVE PREVENTION SWITCHES

[75] Inventor: Richard D. Doerr, St. Louis, Mo.

[73] Assignee: ACF Industries, Inc., New York, N.Y.

[21] Appl. No.: 108,507

[22] Filed: Dec. 31, 1979

[51] Int. Cl.³ ............................................. H02K 11/00
[52] U.S. Cl. ....................................... 310/68 B; 310/83
[58] Field of Search ..................... 310/83, 68 B, 68 R

[56] References Cited

U.S. PATENT DOCUMENTS 2,763,797  9/1956  Dean ................................. 310/68 B
3,930,133  12/1975  Sulzer ........................... 310/68 B X

*Primary Examiner*—Mark O. Budd
*Attorney, Agent, or Firm*—J. Joseph Muller

[57] ABSTRACT

A reversible d.c. motor adjusts the position to which a carburetor throttle valve closes. The throttle valve is mounted on a throttle shaft to one end of which is attached a throttle lever. The motor has an extendable and retractable member one end of which contacts the throttle lever, a rotatable shaft which rotates in one direction or the other when the motor is energized and a gear arrangement for translating rotary movement of the shaft into linear movement of the member. An improvement comprises a switch for de-energizing the motor as the member approaches either extreme of its extending or retracting movement. Deenergization of the motor stops movement of the member before the respective extreme is exceeded thereby to prevent damage to the motor.

4 Claims, 2 Drawing Figures

REVERSIBLE D.C. MOTOR WITH OVER-DRIVE PREVENTION SWITCHES

BACKGROUND OF THE INVENTION

This invention relates to d.c. motor for use in apparatus for automatically controlling the idle speed of an internal combustion engine, and more particularly to an improvement for such a d.c. motor.

Copending applications Ser. Nos. 108,495 and 108,497 filed Dec. 31, 1979, respectively disclose apparatus for automatically controlling the idle speed of an internal combustion engine and apparatus for adjusting the position to which a carburetor throttle valve closes. The apparatus described in the latter application comprises a d.c. motor. While the d.c. motor disclosed therein operates quickly and reliably to adjust the position to which a carburetor throttle valve closes, it is important for proper engine idle speed control to prevent damage to the motor.

SUMMARY OF THE INVENTION

Among the several objects of the present invention may be noted the provision of an improvement in a reversible d.c. motor for adjusting the position to which a carburetor throttle valve closes; the provision of such an improvement to prevent damage to the d.c. motor; and the provision of such an improvement to prevent damage to the d.c. motor without interfering with the response of the motor.

Briefly, a reversible d.c. motor adjusts the position to which a carburetor throttle valve closes, the throttle valve being mounted on a throttle shaft to one end of which is attached a throttle lever. The motor has an extendable and retractable member one end of which contacts the throttle lever, a rotatable shaft which rotates in one direction or the other when the motor is energized and a gear arrangement for translating rotary movement of the shaft into linear movement of the member. The improvement of the present invention comprises switch means for de-energizing the motor as the member approaches either extreme of its extending or retracting movement. De-energization of the motor stops movement of the member before the respective extreme is exceeded thereby to prevent damage to the motor. Other objects and features will be in part apparent and in part pointed out hereinafter.

BRIEF DESCRIPTION OF THE DRAWINGS

Corresponding reference characters represent corresponding parts throughout the views of the drawings.

DESCRIPTION OF A PREFERRED EMBODIMENT

Figure 1:
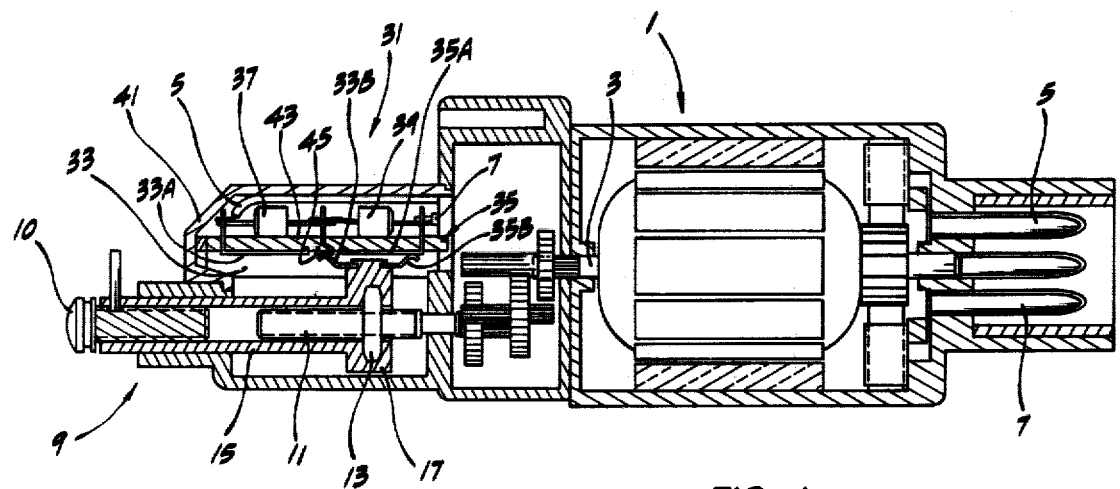
FIG. 1 is a sectional view of d.c. motor illustrating the improvement of the present invention.

Referring to the drawings, a reversible d.c. motor 1 of the permanent magnet type is used with apparatus for automatically controlling the idle speed of an internal combustion engine (not shown). Copending applications, Ser. Nos. 108,495 and 108,497 filed Dec. 31, 1979, disclose such apparatus and the construction of the d.c. motor. As disclosed in these applications the apparatus and d.c. motor control engine idle speed by adjusting the position to which a carburetor throttle valve (not shown) closes or is allowed to close.

D. C. motor 1 is driven in response to electrical signals from a controller (not shown) which is described in copending application Ser. No. 108,495. Operation of permanent magnet d.c. motors is well known in the art and is such that when an input line 5 to the motor is high with respect to an input line 7 to the motor, the motor is driven in one direction; while, if input line 7 is high with respect to input line 5, the motor is driven in the opposite direction. The motor has a rotatable shaft 3 which is caused to rotate in one direction when line 5 is high with respect to line 7 and in the opposite direction when line 7 is high with respect to line 5.

An extendable and retractable member 9 has one end 10 (its outer end) which contacts a throttle lever (not shown) attached to a throttle shaft (also not shown) on which the throttle valve is mounted. This member serves both to open the throttle valve or limit the extent to which it may close. Member 9 comprises a rotatable drive screw 11 and a nut 13 through which the drive screw is threaded. An elongate sleeve 15 extends outwardly from the housing of d.c. motor 1 and the outer end of the sleeve contacts the throttle lever 3. Sleeve 15 is of a hollow cylindrical construction and the inner end of the sleeve has an enlarged diameter section 17. Nut 13 is captured or retained in this portion of sleeve 15 and the inner diameter of the sleeve is such as to accomodate the threaded portion of drive screw 11 when it is threaded through the nut. Rotation of drive screw 11 in either direction produces linear movement of sleeve 15 in the appropriate direction to either extend or retract member 9.

A gearing arrangement 19 comprising a plurality of gears translates rotary movement of motor shaft 3 into linear movement of member 9. A first gear 21 is a pinion gear and is attached to the outer end of motor shaft 3. A second gear 23 is attached to a shank 25 of drive screw 11. This shank extends inwardly into the housing of d.c. motor 3. The remaining two gears, 27 and 29 respectively, are intermediate gears which act to reduce the number of rotations or turns of motor shaft 3 to produce one revolution or turn of drive screw 11. The gears comprising gearing means 19 are designed to provide a gear reduction ratio in the range of approximately 6:1 to approximately 20:1. The arrangement of gears is such that rotation of shaft 3 and pinion gear 21 produces rotation in the opposite direction of gear 23 and drive screw 11. Rotation of drive screw 11 either draws nut 13 further onto the drive screw or backs it off, the direction of movement depending upon the direction of screw rotation. Since nut 11 is retained in sleeve 15, movement of the nut produces linear movement of the sleeve and hence member 9 in one direction or the other. As described in copending application Ser. No. 108,495, the movement of member 9 permits a greater or lesser degree of closure of the carburetor throttle valve. This, in turn, permits control of the idle speed of engine E.

While operation of d.c. motor 1 reliably and effectively produces the desired control, it is important, in order to maintain the proper degree of control, to prevent damage to the motor. It has been determined that motor damage is most likely to occur when member 9 is driven part of its extreme or limit positions. To prevent this, the improvement of the present invention comprises switch means 31, for de-energizing d.c. motor 1 as member 9 approaches either of its extreme positions.

Switch means 31 comprises first and second sets, 33 and 35 respectively, of electrical contacts.

Figure 2:
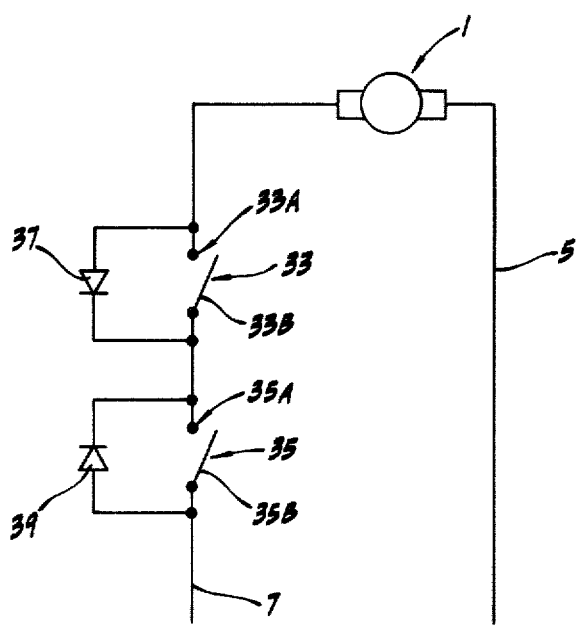
FIG. 2 is a schematic diagram representing operation of the present invention.

Referring to FIG. 2, contact sets 33 and 35 are series connected and each set of contacts is shunted by a diode, 37 and 39 respectively. Both sets of contacts are normally closed when member 9 is being moved in an intermediate range of positions between fully extended and fully retracted. In this range, both diodes are shorted by the closed sets of contacts and power is supplied to the motor to drive shaft 3 in the desired direction to extend or retract member 9. As member 9 is driven to one of its extreme positions, for example, its fully extended position, contact set 33 opens, while contact set 35 remains closed. Because the current direction through motor 1, to extend member 9, is from line 5 to line 7, diode 37 blocks this flow of current and the motor is de-energized. When line 7 goes high with respect to line 5 (to drive motor 1 in the opposite direction and retract member 9), a current path is provided by the closed set 35 of contacts and diode 37. As the member retracts, set 33 of contacts closes. As the member reaches its extreme retracted position, set 35 of contacts opens and diode 39 now blocks the current path through motor 1 in this direction, again de-energizing the motor.

Referring again to FIG. 1, a cover 41 encloses the forward section of d.c. motor 1 and a horizontal plate 43 is located within the cover above sleeve 15. One contact, 33A and 35A respectively, of each set of contacts is located on the underside of plate 43 and extends upwardly through the plate to terminate in a contact post. The portion of contacts 33A and 35A on the underside of plate 43 form elongate contact pads extending some length along the underside of the plate. Line 5 is connected to the contact post of contact 33A, while line 7 is connected to the contact post of contact 35A. A third electrical contact 45 is also located on the underside of plate 43 and extends upwardly through the plate to form a contact post. The anodes of respective diodes 37 and 39 are connected to this post.

The other contact in each set of contacts, contacts 33B and 35B respectively, are attached to the top surface of portion 17 of sleeve 15. Each contact extends upwardly and bears against its companion contact 33A or 35A. Because contacts 33B and 35B are attached to sleeve 15, they move relative to respective contacts 33A and 33B with sliding contact being maintained between the contacts in each set. As however, member 9 reaches one of its extreme positions, the sliding contact in the appropriate set moves off the pad portion of its companion contact thus opening the circuit path through the motor and causing it to stop. This moving contact now closes with contact 45 to maintain a circuit path through motor 1 so the motor can be driven to move member 9 in the opposite direction. Thus as shown in FIG. 1, contact set 33 is open with contact 33B resting on contact 45. At the same time, contacts 35A and 35B are closed. This is the condition when member 9 is fully retracted. Were the member fully extended, contacts 33A and 33B would be closed, contact set 35 would be open and contact 35B would be bearing against contact 45. In either instance, the current path through motor 1 to drive the motor in the direction to move member 9 past its limit position is blocked by the appropriate diode 37 or 39, while a current path through the motor to energize it to drive member 9 in the opposite direction is maintained.

As a result, damage to motor 1 caused by attempting to drive member 9 past its extreme or limit position is prevented thus insuring the motor continues to quickly and reliably respond to control signals supplied it.

In view of the above, it will be seen that the several objects of the invention are achieved and other advantageous results obtained.

As various changes could be made in the above constructions without departing from the scope of the invention, it is intended that all matter contained in the above description and shown in the accompanying drawing shall be interpreted as illustrative and not in a limiting sense.

What is claimed is:

1. In a reversible d.c. motor for adjusting the position to which a carburetor throttle valve closes, the throttle valve being mounted on a throttle shaft to one end of which is attached a throttle lever, the motor having an extendable and retractable member one end of which contacts the throttle lever, a rotatable shaft which rotates in one direction or the other when the motor is energized and a gear arrangement for translating rotary movement of the shaft into linear movement of the member, the improvement comprising switch means for de-energizing the motor as the member approaches either extreme of its extending or retracting movement, de-energization of the motor stopping movement of the member before the respective extreme is exceeded thereby to prevent damage to the motor, the switch means comprising first and second sets of electrical contacts, each set of contacts being normally closed with one contact in each set being carried by the member and moving relative to the other contact as the member moves, the contacts of the respective set of contacts opening as the member reaches its respective extreme extended or retracted position thereby to open an electrical circuit through which power is supplied to the motor and de-energize the motor, the switch means still permitting energization of the motor to drive the member in the opposite direction.

2. The improvement as set forth in claim 1 wherein the member comprises a rotatable drive screw, a nut through which the screw is threaded, and a sleeve in which the nut is captured, the gear arrangement coupling the motor shaft to the drive screw whereby rotation of the motor shaft produces linear movement of the sleeve and one contact of each set of contacts is mounted on the sleeve and moves therewith.

3. The improvement as set forth in claim 2 wherein the other contact in each set of contacts is attached to a plate and sliding contact is maintained between the contacts in each set as the sleeve moves in either direction.

4. The improvement as set forth in claim 3 further including a diode associated with each set of contacts, the diodes serving to block current flow through the motor to drive the member past its extreme position when the set of contacts the diode is associated with open.

* * * * *